United States Patent

[11] 3,627,823

| [72] | Inventors | Rudolf Brockhaus;<br>Willi Ziegenbein, both of Marl, Germany |
|---|---|---|
| [21] | Appl. No. | 771,632 |
| [22] | Filed | Oct. 29, 1968 |
| [45] | Patented | Dec. 14, 1971 |
| [73] | Assignee | Chemische Werke Huls Aktiengesellschaft<br>Marl, Germany |
| [32] | Priority | Nov. 7, 1967 |
| [33] | | Germany |
| [31] | | P 16 43 822.5 |

[54] PROCESS FOR THE PREPARATION OF ACETIC ACID
3 Claims, No Drawings

[52] U.S. Cl. .................................................. 260/530 R,
260/531 R, 260/541
[51] Int. Cl. .................................................. C07c 53/08
[50] Field of Search .................................... 260/530,
531, 541

[56] References Cited
UNITED STATES PATENTS
3,431,297   3/1969   Brockhaus .................... 260/533

OTHER REFERENCES
March, Advanced Organic Chemistry, pp. 753– 755, Mc-Graw–Hill Book Co., New York

*Primary Examiner*—Lorraine A. Weinberger
*Assistant Examiner*—Richard D. Kelly
*Attorney*—Pierce, Scheffler & Parker

ABSTRACT: Acetic acid is produced by the gaseous phase oxidation of short-chain aliphatic compounds, with oxygen or an oxygen-supplying gas, in the presence of water vapor, at a temperature within the 200°–400° C. range, using a metal-vanadate catalyst.

PROCESS FOR THE PREPARATION OF ACETIC ACID

The invention relates to a process for the preparation of acetic acid by the catalytic oxidation, in the gaseous phase, of short-chain aliphatic compounds with oxygen or an oxygen-containing gas, in the presence of water vapor, through the use of metal-vanadate catalysts at higher temperature.

Processes of this sort are used for the purpose of improving generally the known oxidations in the liquid phase whereby preferably ketones are obtained from unsaturated hydrocarbons possessing three or more carbon atoms, the oxidation being effected in the presence of noble metal catalysts, and whereby mixtures of carboxylic acids, glycols and their esters are obtained if the process is carried out without the use of catalysts and at higher reaction temperatures. Under these conditions of reaction, the materials in question tend to become resinous, resulting in low yields of useful products.

The above-described difficulties will not occur if olefins are oxidized in the gaseous phase. Even compounds, such as acrolein and acrylic acid, which have a strong tendency to polymerize, can be prepared in high yields from hydrocarbons (DAS 1 139 480). In this case, propylene is used as basis, which compound is oxidized selectively at the methyl group in the presence of very specific catalysts. Acetic acid is also obtained by side reaction at the double bond.

Recently, processes have been developed employing catalytic oxidation in the gaseous phase in which processes the olefinic double bond reacts specifically, whereby the chain of carbon atoms is split by oxidation at this point. In this manner a propylene molecule is broken into two dissimilar parts, namely, one molecule each of acetic acid and formic acid. The formic acid is unstable under the conditions of the oxidation in the gaseous phase and continues to react further to carbon monoxide or carbon dioxide.

Forward progress was made by way of specific methods which make feasible the oxidation in the gaseous phase specifically from butenes to acetic acid, since butenes are becoming available at increasing quantities and at low prices from the refineries (French Pat. No. 1,470,474 and French Pat. No. 1,479,681; Belgian Pat. No. 692,298). High yields of acetic acid are thus obtained provided the process is carried out in the presence of water vapor at temperatures ranging from 200° to 400° C. and of catalysts comprising tin-, antimony-, titanium- or aluminum vanadate. From one molecule of n-butene there are produced, almost quantitatively through two identical fragments, two molecules of acetic acid, and it is possible to employ either n-butene-1 or n-butene-2, with the latter either in cis- or trans- form; under the reaction conditions the double bond wanders into the 2-position. Obviously, isobutene follows its structural condition, the reaction resulting in one molecule of acetic acid and two unstable molecules of formic acid. It would also be possible to employ in this manner mixtures of the above-mentioned butenes, but this process will always be the oxidation of specific and per se chemically identical, $C_4$-olefins.

Lately, there have become industrially available in increasing quantities short-chain aliphatic compounds which are difficult to utilize, that is, difficult to convert into specific and valuable products. The compounds in question are primarily isobutyraldehyde, methylethylketone, acetone, secondary butanol, tertiary butanol and isobutanol, which compounds are obtained either in comparatively pure form or in admixture with each other. For example, in the case of the so-called "oxosynthesis" of n-butyraldehyde from propylene, carbon monoxide and hydrogen there are generated by necessity large quantities of isobutyraldehyde which heretofore had required elimination by combustion. Isobutyraldehyde is very susceptible to oxidation, so that any of these industrial products which come into contact with air will always contain some isobutyric acid which however is also oxidized to acetic acid by means of the above-defined method. Since isobutyric acid is obtained in some cases as a necessary byproduct, the method makes it feasible to convert this acid to acetic acid which can be sold at a higher price.

Accordingly, there exists an urgent need to utilize economically and jointly such short-chain aliphatic compounds, with the object of obtaining an homogeneous and pure reaction product. The present invention is designed to solve this problem.

According to the invention, the problem is solved by oxidizing by means of the above described basic process secondary-, tertiary- or iso-butanol, isobutyraldehyde, isobutyric acid, acetone or methylethylketone in the form of a short-chain aliphatic compound. The short-chain aliphatic compounds employed according to the invention can be used in pure or mixed form, or can be derived from industrial production. The reaction temperature can range from 200° to 400° C., preferably from 200° to 340° C., and most appropriately from 200° to 320° C. Oxygen, most expediently in mixture with an inert gas, serves as oxidizing agent; use of air is the preferred method.

The reaction is controlled by the expedient of including water vapor in the reaction mixture. A suitable gas to be introduced consists of 40 to 90 percent by volume of air, 10 to 60 percent by volume of water vapor and 0.5 to 5 percent by volume of the short-chain aliphatic compound starting material to be oxidized, especially 50 to 90 percent by volume of air, 10 to 50 percent by volume of water vapor and 0.8 to 2.0 percent by volume of the aliphatic compound. These data are not to be interpreted as limiting values because the data will vary by necessity in accordance with the conditions of operation, such as reactor dimensions, catalyst concentration and catalyst throughput, and especially in accordance with the type of aliphatic compound employed as starting material. The alcohols, and in particular secondary butanol, require relatively large quantities of water vapor for the control of the reaction; the carbonyl compounds, especially isobutyraldehyde, need only lesser amounts water vapor. requirements for isobutyric acid are between these two extreme ranges.

The catalysts, the preparation of which will be described by means of examples, can be employed in the form of chemically pure compounds or in combination with carrier materials, for example diatomaceous earth or aluminum oxide, and preferably with active silica gel.

The carbonyl compounds react with great ease. None of the compounds mentioned require any specific measures. The same holds true for the final processing.

It is greatly surprising that all compounds mentioned are susceptible to a directed oxidation, a feature which previously could be attained only in case of the defined $C_4$-olefins. For example, in case of isobutyraldehyde as well as isobutanol the formation of isobutyric acid surely would have been expected. By way of comparison: methacrolein is converted at high selectivity to methacrylic acid by catalytic oxidation in the gaseous phase (Belgian Pat. No. 602,472, example 5; U.S. Pat. No. 2,881,212). In carrying out the process of the present invention this acid is not formed at all. If isobutyric acid is employed, it is oxidized and forms acetic acid. During the course of the oxidation of isobutyric acid, acetone is obtained as a byproduct in quantities of approximately 10 to 15 percent of the total conversion which can be separated from the crude acid and returned to the reactor so that in the final analysis only acetic acid will be obtained.

In the case of the other listed compounds, especially the $C_3$-compound of acetone, any predictions concerning the course of the oxidation are more difficult and involved, and the selectivity of the acetic acid formation was altogether unexpected. This holds true in particular if consideration is given to the facts that the very narrow group of $C_4$-olefines—as discussed above in relation to the state of the art—comprises a specific compound only, and that the usable catalysts likewise represent a very narrow, selectively acting, chosen group.

In theory, by the carrying out of the new process there are produced one mol of acetic acid from one mol of isobutyraldehyde, acetone, iso- or tertiary butanol, and two mols of acetic acid from methylethylketone and secondary butanol. Actual yields come very close to these stated theoretical values. It is for this reason more economical to employ this claimed process and to produce acetic acid in this manner than it is to process impure basic materials by purification, or to burn such materials, thereby obtaining energy.

The examples given below demonstrate the use of the process in practice.

A. PREPARATION OF THE CATALYSTS

Titanium Vanadate (Catalyst I):

900 g. of titanium tetrachloride and 576 g. of vanadium pentoxide are fully dissolved in 4 1. of concentrated hydrochloric acid. 2 1. of water are placed into a stirrer vessel, and the acid solution is introduced, whilst stirring, into the water and is continuously neutralized by means of ammonia,—this step being controlled by the use of a glass electrode—causing a dark-brown precipitation Three liters of water are added gradually during the precipitation process which extends over a period of approximately 30 minutes. The temperature in the mixer is 75° C. At this temperature the stirring is continued for another hour, after which the mother-liquor is drawn off and disposed of. The precipitate is washed thoroughly, dried and thereupon tempered at slight aeration: for 16 hours at 300° C. and for 8 hours at 420° C. The catalyst so produced is then granulated and screened (screen diameter 3 to 4 mm.) The atomic proportion of titanium/vanadium within the catalyst amounts to 1/0.95.

Aluminum Vanadate (Catalyst II)

750 g. of $Al(NO_3)_3 \cdot 9H_2O$ and 182 g. of vanadium pentoxide are dissolved in 3.5 1. of concentrated hydrochloric acid. 2 liters of water are placed into a stirrer vessel. The acid solution in introduced, under stirring, into the water and the mixture is continuously neutralized by means of ammonia, this step being controlled by a glass electrode. 5 liters of water are added gradually during the precipitation process lasting 15 minutes, with the temperature in the vessel being maintained at 35° to 40° C. The stirring is continued for another hour at this temperature. The mother-liquor is drawn off and disposed of. The precipitate is washed with water, dried at 200° C. and then tempered for 16 hours at 520° C. using a slight stream of air. The catalyst is then granulated and screened (screen diameter 3 to 4 mm.). The atomic proportion aluminum/vanadium within the catalyst is 1/1.05.

Antimony Vanadate (Catalyst III).

456 g. of antimony trichloride and 182 g. of vanadium pentoxide are dissolved in 2 1. of hydrochloric acid of 17 percent concentration. 1 liter of water at 20° C. is placed into a stirrer vessel, and the acid solution, together with a 10 percent solution of ammonia, are introduced into the stirrer vessel. The pH value is kept at 7 by means of a glass electrode control. The precipitation lasts 10 minutes; the temperature in the vessel rises and is maintained at 60° C. The stirring is continued at this temperature for another hour, and the precipitate is then filtered and washed. The moist precipitate contains 360 g. of antimony vanadate. Then 120 g. of silicic acid—trade description "Aerosil 380"—is mixed with the moist precipitate of antimony vanadate. The resulting paste is dried and the mass is heated for 15 hours to 550° C. in a slow stream of air. The catalyst so produced is graduated to a grain size of 3 to 4 mm. and then utilized. Its composition is 24.8 percent of $SiO_2$, 34.6 percent of $V_2O_5$ and 40.6 percent of $Sb_2O_3$.

Tin Vanadate (Catalyst IV).

677 g. of tinchloride ($SnCl_2 \cdot 2H_2O$) and 182 g. of vanadium pentoxide are dissolved in 3 liters of hydrochloric acid of 17 percent concentration. 1 liter of water at 60° C. is placed into a stirrer vessel. The acid solution is introduced into the stirrer vessel together with a quantity of ammonia solution sufficient to adjust the PH value of the mixture to 5, causing immediate precipitation. The pH value is controlled by means of a glass electrode. Addition time is 15 minutes. The temperature within the mixing vessel is 60° C. Further processing is accomplished in the same manner as described above for catalyst II. The activation temperature is 480° C. The atomic proportion of tin to vanadium in the catalyst so prepared is 1:0.71.

B. OXIDATION IN THE GASEOUS PHASE 250 ml. of catalyst are placed in a steel tube of 5 m. length and 15 mm. diameter, the tube being heated by a salt bath. Through the reactor there is conveyed a gaseous-phase mixture of air (300 N1./h.), water vapor N1./h. s. Table, column 5) and hydrocarbon (Nl./h. s. table, column 4). The emerging gas is cooled so that water and acid will condense. The data of the experiments carried out for examples 1 to 13 are listed in the accompanying table.

TABLE

| 1 | 2 | 3 | 4 | 5 | 6 | 7 | 8 | 9 | 10 | 11 |
|---|---|---|---|---|---|---|---|---|---|---|
| Example | Catalyst | Aliphatic compound (AC) | N l./h. AC | N l. H₂O/h. | React. temp., °C. | Conversion AC, percent | Yield of raw acetic acid, percent | Percent pure acetic acid | 1 kg. AC→X kg. acetic acid | Stoichiometric factor 1 kg. AC→X kg. acetic acid |
| 1 | I | IBA¹ | 8 | 80 | 250 | 100 | 85 | 97.5 | 0.708 | 0.833 |
| 2 | II | IBA | 13 | 130 | 255 | 100 | 82 | 99 | 0.685 | 0.833 |
| 3 | I | I-butanol | 10 | 150 | 255 | 100 | 56 | 93 | 0 455 | 0.81 |
| 4 | I | Sek. butanol | 10 | 250 | 235 | 100 | 55 | 95 | 0.890 | 1.62 |
| 5 | I | Tert. butanol | 8 | 180 | 245 | 100 | 60 | 97 | 0.486 | 0.81 |
| 6 | I | Acetone | 10 | 150 | 245 | 96 | 80 | 96 | 0.825 | 1.03 |
| 7 | I | MAK | 4 | 150 | 230 | 100 | 75 | 98 | 1.25 | 1.666 |
| 8 | III | Acetone | 18 | 180 | 245 | 98 | 75 | 98 | 0.758 | 1.03 |
| 9 | IV | IBA² | 12 | 120 | 235 | 89 | 60 | 96 | 0.445 | 0.833 |
| 10 | I | IBS | 10 | 150 | 221 | 98.5 | ¹75 | 98 | 0.5 | 0 68 |
| 11 | II | IBS | 10 | 150 | 228 | 99.0 | ²72 | 96 | 0.47 | 0.68 |
| 12 | III | IBS³ | 10 | 130 | 242 | 95.2 | ³68 | 97 | 0.49 | 0.68 |
| 13 | IV | IBS | 10 | 140 | 222 | 97.8 | ¹74 | 96 | 0.48 | 0.68 |

¹ Plus 12% acetone.  ² Plus 11% acetone.  ³ Plus 14% acetone.

Explanation of table:
Column 3—IBA = isobutyraldehyde; MAK = methylethylketone; IBS = isobutyric acid
Column 8—Acid determined by titration and computed as acetic acid
Column 9—percent content of pure acetic acid in the anhydrous crude acid
Column 10—1 kg. of raw material results in .. kg. of anhydrous crude acid
Column 11—Theoretical yield in kg. from 1 kg. of the listed aliphatic compound.

We claim:

1. Process for the preparation of acetic acid which comprises catalytically oxidizing, with oxygen or an oxygen-containing gas, in the gaseous phase, a short-chain aliphatic compound selected from the group consisting of secondary-, tertiary- and iso-butanol, isobutyraldehyde, isobutyric acid, acetone and methylethylketone, in the presence of water vapor and of a metal-vanadate catalyst selected from the group consisting of the vanadates of tin, antimony, titanium and aluminum at a reaction temperature of from 200° to 400° C.

2. Process as defined in claim 1, in which the oxidation is effected at a reaction temperature from 200° to 340° C.

3. Process as defined in claim 1, in which the oxidation is effected at a reaction temperature from 200° to 320° C.

* * * * *